United States Patent [19]

Spanjer et al.

[11] Patent Number: 4,880,582
[45] Date of Patent: Nov. 14, 1989

[54] HARDENING GRANULATED MATERIAL AT ELEVATED TEMPERATURES

[75] Inventors: Jacobs J. Spanjer, Nunspeet; Pieter D. Rademaker, Haarlem, both of Netherlands

[73] Assignee: Aardelite Holding B. V., Netherlands

[21] Appl. No.: 76,313

[22] Filed: Jul. 22, 1987

[51] Int. Cl.⁴ .............................................. B29B 9/16
[52] U.S. Cl. ............................... 264/82; 106/DIG. 1; 264/37; 264/117; 264/122; 264/DIG. 49
[58] Field of Search ................... 264/37, 82, 117, 122, 264/333, DIG. 35, DIG. 49; 106/DIG. 1, 109, 110, 111, 118, 120, 85

[56] References Cited

U.S. PATENT DOCUMENTS

| 4,219,519 | 8/1980 | Goksel | 264/82 |
|---|---|---|---|
| 4,264,543 | 4/1981 | Valenta | 264/37 |
| 4,394,176 | 7/1983 | Loggers | 106/120 |
| 4,419,312 | 12/1983 | Loggers et al. | 264/82 |
| 4,490,178 | 12/1984 | Loggers et al. | 106/118 |

FOREIGN PATENT DOCUMENTS

| 2801687 | 7/1979 | Fed. Rep. of Germany | 106/DIG. 1 |
|---|---|---|---|
| 8200193 | 8/1983 | Netherlands | |
| 1438303 | 6/1976 | United Kingdom | 106/DIG. 1 |
| 2159143 | 11/1985 | United Kingdom | 106/120 |

OTHER PUBLICATIONS

WO84/01367 Apr. 12, 1984.

Primary Examiner—Jan H. Silbaugh
Assistant Examiner—Mary Lynn Fertig
Attorney, Agent, or Firm—Michael N. Meller

[57] ABSTRACT

A process for manufacturing hardened granules produced by mixing at least fly ash obtained from combustion of a material selected from a coal product and lignite, a binder and water, forming granules of said mixture, hardening said granules in an embedding material at a temperature between 85° and 212° F. by applying heat and separating the hardened granules from the embedding material, said embedding material being used for forming new granules, including the step of embedding the non hardened granules after granulation in a hardening reactor in a fine grained material with a water absorption capacity of at least 8% and being free from a compound generating heat by contacting water, and supplying heat to the mixture of granules and embedding material in said hardening reactor by introducing steam into the mixture of granules and embedding material as present in the hardening reactor to raise and maintain the temperature at a value comprised between 85° F. and 212° F., the ratio between the quantity of embedding material and granules being comprised between 0.2 and 1.

9 Claims, 1 Drawing Sheet

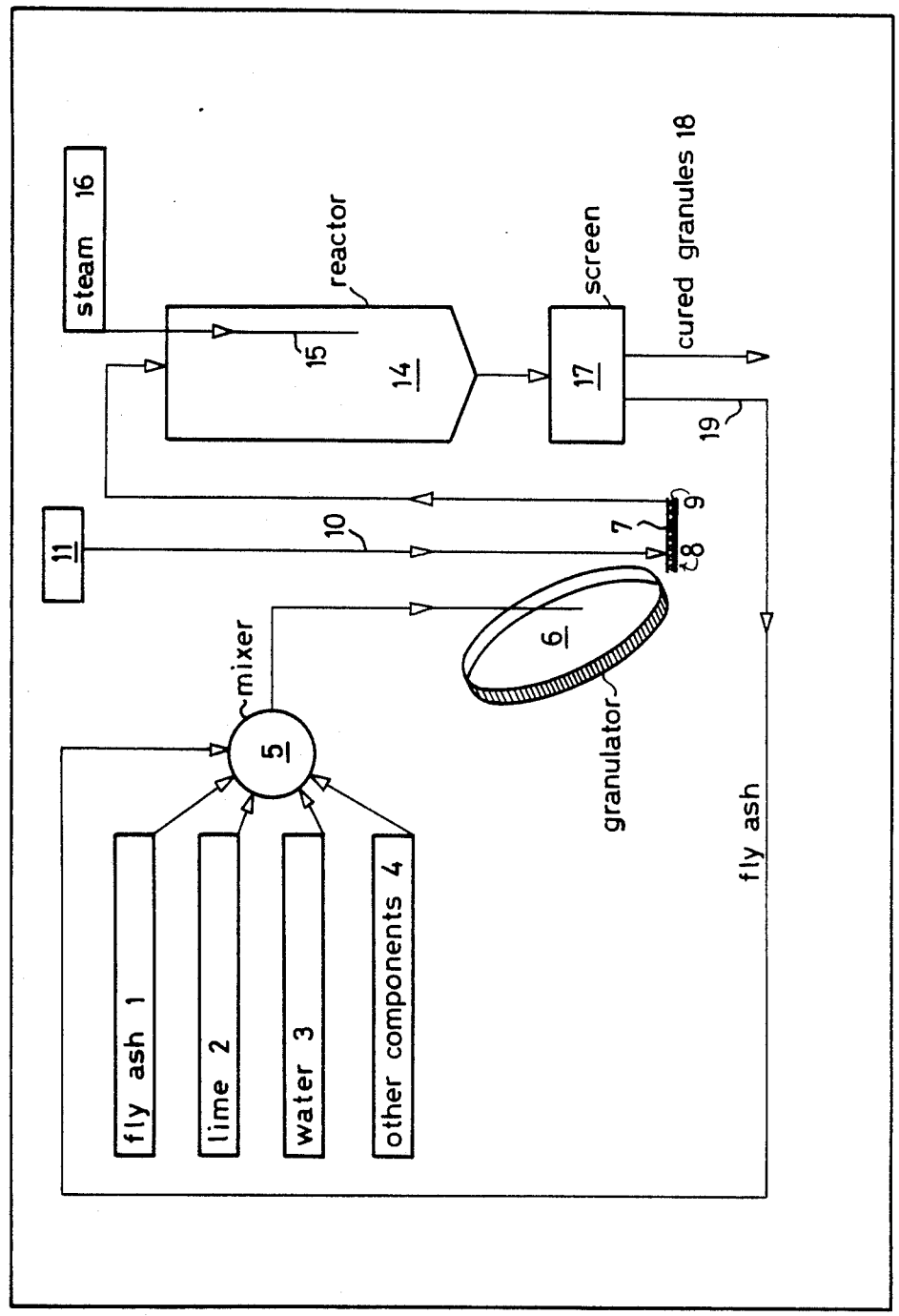

HARDENING GRANULATED MATERIAL AT ELEVATED TEMPERATURES

BACKGROUND OF THE INVENTION

This invention relates to an improved method of producing hardened granulated material, obtained by mixing at least water, a binder and fly ash and forming granules by any of the usual granulation techniques, and curing at elevated temperatures.

Many patents and publications describe the production of hardened material on the basis of fly ash and a binder. As a binder calcium hydroxide or a product that will produce calcium hydroxide in an aqueous system may be used (e.g. U.S. Pat. Nos. 4,419,312: 4,394,176: 4,490,178: and PCT/GB No. 83/00248).

An embodiment of this reaction is disclosed in Dutch Patent Application No. 8200193, wherein uncured granules and hot fly ash are mixed in a mixer which is also fed with steam. The hot fly ash comes directly from a coal fired plant. The mixture from the mixer is fed to a curing or hardening silo in which a temperature of just below 100° C. is reached. The partially cured granules and fly ash leaving the silo are separated from each other and the fly ash is recyled for use as starting material for producing new granules.

The partially cured granules are passed into an intermediate storage silo where the partially cured granules are further cured by means of steam.

Another embodiment is disclosed in U.S. Pat. No. 4,490,178. Granules of better compressive strength are obtained by subsequently hardening the granules at temperatures between 85° and 212° F.

In said method the granules are hardened under moist conditions by embedding said granules in a mixture of sand, water and calciumoxide. An advantage of this process is that the heat generated by the slaking of calciumoxide is used in direct contact with the granules for curing or hardening of the granules at elevated temperatures.

A mixture of sand and calcium oxide as embedding material provides very high strength granules but is not always economically practical or required. For example, lower strength granules may satisfy some cement block manufacturing requirements. However, the use of spent embedding material is necessary for good process economics, but lower strength granules do not require the use of sand in the granule mixture, and thus spent sand embedding material is not recycled back for granule mixing. It would be economically advantageous to therefore use an embedding material which could be recycled back into the mixture for forming granules.

Also, although all of the required heat for the hardening of the granules can be solely supplied by steam without embedding material, our experiments have shown that the sole use of steam as a heating source for curing the granules without embedding material has various disadvantages.

(i) Handling and storage of non hardened or insufficiently hardened granules is difficult and causes degradation of the granules.

(ii) The condensation of steam involves formation of water causing the granules to stick together which will hinder the separation of the hardened granules at the end of the hardening process.

(iii) Direct contact of the granules with steam can cause cracks in the granules which will lower their final strength considerably.

Thus the use of embedding material is deemed to be advantageous. However, such embedding material must meet specific criteria for curing.

SUMMARY OF THE INVENTION

A primary object of the present invention is to provide an improved method to harden granulated material at temperatures between 85° and 212° F.

This is attained in accordance with the present invention in that a process of manufacturing hardened granules produced by mixing at least fly ash obtained from combustion of a material selected from a coal product and lignite, a binder and water, forming granules of said mixture, hardening said granules in an embedding material at a temperature between 85° and 212° F. by applying heat and separating the hardened granules from the embedding material, said embedding material being used for forming new granules, comprises the step of embedding the non hardened granules after granulation in a hardening reactor in a fine grained material with a water absorption capacity of at least 8% and being free from a compound generating heat by contacting water, and supplying heat to the mixture of granules and embedding material in said hardening reactor by introducing steam into the mixture of granules and embedding material as present in the hardening reactor to raise and maintain the temperature at a value comprised between 85° F. and 212° F., the ratio between the quantity of embedding material and granules being comprised between 0.2 and 1.

It should be noted that in the process of the invention heat must be supplied by introducing steam into the mixture of granules and embedding material, contacting the granules with hot fly ash of a temperature sufficient for raising the temperature to a value comprised between 85° F. and 212° F. will result in granules not meeting the strength properties stipulated for practical use of such hardened granules.

If the ratio between the quantity of embedding material and granules is smaller than 0.2 no sufficient embedding is possible resulting in granules of insufficient strength. At a ratio higher than 2.0 the process will produce a stream of embedding material which cannot be used as a whole for forming granules. This means waste of energy as the embedding material which cannot be used directly for forming granules will cool to ambient temperature during storage and cannot be used for forming granules of a somewhat higher temperature as in the process of the invention.

In an advantageous embodiment of the invention a fly ash material having a water absorption capacity of more than 10%, preferably of 15–25% is distributed on a conveying system between a granulating station and a hardening reactor whereby the granules drop on to a layer of fly ash. Mixing of fly ash and granules is completed when the granules with fly ash enter the hardening reactor. Because of the presence of fly ash the uncured granules can be handled without breaking and can then be piled up in the curing reactor without deformation. Steam for increasing the temperature as required for hardening the granules particularly at a temperature comprised between 85° and 212° F. that condenses will then deposit on the embedding material which has a higher specific surface area than the granules. Heat released by condensation of steam will be transferred to the granules by conduction so that virtually no steam condensation will occur at the surface of the granules. After completion of the hardening, the granules are separated from the embedding fly ash and this fly ash is returned as a feedstock to a mixing station where fresh fly ash, lime and water are added. In the process the use of lime as a binder is preferred, said lime can be added either as calciumoxide or as calcium hydroxide. Other suitable binders could be latent hydraulic components which would produce calcium hydroxide if mixed with water.

Preferably the weight ratio of embedding material to granules is from about 0.3 to 0.45.

The embedding material becoming moist by condensation of steam has preferably a pH above 4 in the moist state.

DESCRIPTION OF THE DRAWINGS

The FIGURE is a block flow diagram illustrating an embodiment of the invention.

DESCRIPTION OF THE PREFERRED EMBODIMENT

The FIGURE shows an installation for executing the process of the invention.

This installation comprises a mixer for mixing lime as binder from a binder supply container 2, water from a water supply container 3, fly ash from a fly ash supply container 1 and optionally other components from supply container 4.

The mixture is conveyed from mixer 5 to a granulator 6, the granules 7 from said granulator are deposited upon an endless belt 8 bearing a layer of an embedding material in the form of an embedding material in the form of fly ash 9 fed by line 10 from embedding material container 11.

The mixture of embedding material 9 and granules 8 is passed into the hardening reactor 14 being in open connection with the surrounding ambient. By means of steam line 15 steam from steam supply 16 is introduced into the mixture of granules and embedding material in the reactor 14.

After hardening the granules are separated from the embedding material by means of screen 17, the granules being conveyed by belt 18 to a storage, the embedding material being fly ash being conveyed to mixer 5 through conveyor 19.

The embodiment of the invention offers the possibility to produce hardened granules according to the FIGURE without producing any waste streams whatsoever. If the embedding material i.e. fly ash is separated from the granules after hardening and it is used directly as a feedstock for the process, the heat contained in this fly ash is also recuperated.

The hardening is advantageously effected at a temperature above 85° F. and more preferably above 160° F.

The ratio of granules to embedding material is such that for 100 lbs of granules 20–100 lbs of fly ash are used as embedding material. More preferably 30–45 lbs of fly ash are used for 100 lbs of granules.

These other components can be residues of combustion processes, such as bottom ash, ash from fluidized bed boilers (atmospheric, pressurzed or circulating), ash from municipal waste burners, ash from Refuse Derived Fuel burners, ash from the combustion of sub-bituminous coals, ash from lignite, ash from peat, sand, gypsum, calcium sulfite or various inorganic waste products from industrial processes.

The embedding material may consist of warm or cold dry fly ash, but wet fly ash from temporary disposal sites can also be used. Other embedding materials can be used, provided that such materials have sufficient adsorption capacity to absorb all the condensing steam and that such material will not interfere with the hardening reactions.

In all instances the embedding material should be fine grained in order to be able to cover the soft granules and to fill voids between the granules. Fine grained means a particle size distribution with more than 80% passing a 1 mm screen and more than 50%, preferably more than 80%, passing a 250 mm screen.

EXAMPLE I

A quantity of 110 lbs of fly ash from a coal-fired power station are mixed with 6.2 lbs of powdered quick lime as inorganic binder and 26.9 lbs of water. After mixing and granulating, a 10 lbs sample of granules is mixed with 4 lbs of dry fly ash 90% of said fly ash having a particle size of smaller than 100 mm. The granules embedded in the free fly ash are heated at 195° F. in a moist atmosphere by introducing steam of 265° F., the pH of the moist fly ash formed by condensation of steam has a pH above 4.

Another 10 lb sample of granules is heated in the same way without embedding material. After 16 hours the compressive strength of the granules is determined. From each 10 lbs batch, 20 granules ranging in sizes from 0.31–0.39 inch diameter are selected and compressed between parallel metal plates.

Granules embedded in fly ash show an average compressive strength of 55 lbs, while granules without embedding material have an average compressive strength of 4 lbs.

EXAMPLE II

A quantity of 110 lbs of fly ash from a coal fired power station are mixed with 7.5 lbs of calcium hydroxide and 20 lbs of water. The mixture is granulated.

A 10 lbs batch of granules is embedded in 4 lbs of dry fly ash.

a 10 lbs batch of granules is embedded in 4 lbs of moist fly ash containing 6% water.

A 10 lbs batch of granules is not embedded.

After curing at 195° F. for 16 hours in a moist atmosphere by introducing steam of 265° F. in the mixture of fly ash and granules, the compressive strength for the granules is respectively:

61 lbs for granules embedded in dry fly ash
50 lbs for granules embedded in moist fly ash
20 lbs for granules without embedding.

EXAMPLE III

A 15,000 lbs batch of granules is prepared by mixing batches of 175 lbs of fly ash, 3.0 lbs of calcium sulphate dihydrate, 7.3 lbs of lime inorganic binder and 44 lbs of water. The granulated mixture is mixed with moist fly ash containing 5% water.

The embedded granules are introduced in a hardening reactor. By introducing steam of 275° F. the temperature is raised to 204° F. After 18 hours at that temperature the reactor is discharged. Granules are separated from the embedding material by screening. The average compressive strength for the 0.31–0.39 inch diameter granules is 58 lbs. The separated embedding material is used for forming granules as in example I. The compressive strength of granules obtained from fly as that has been used as embedding material does not differ from the values found in example I.

EXAMPLE IV

Example III is repeated but instead of 3.0 lbs of calcium sulphate dihydrate, 3.0 lbs of a mixture of calcium sulphate dihydrate and calcium sulphite as obtained from flue gas desulfuration or 3.0 lbs of fly ash from the combustion of sub bituminous coals or 3.0 lbs of ash from municipal waste burner is added.

Similar results as in Example III are obtained.

What is claimed is:

1. A process of manufacturing hardened granules produced by mixing at least fly ash obtained from combustion of a material selected from the group consisting of a coal product and lignite, a binder and water, forming granules of said mixture, hardening said granules in an embedding material at a temperature between 85° and 212° F. by applying heat and separating the hardened granules from the embedding material, comprising the step of feeding fine grained embedding material and granules to be cured into a hardening reactor and
embedding the granules in said hardening reactor in said fine grained embedding material with a water absorption capacity of at least 10% and being free from a compound generating heat by contacting water and supplying heat to the mixture of granules and embedding material in said hardening reactor by introducing steam into the mixture of granules and embedding material as present in the hardening reactor to raise and maintain the temperature at a value between 85° and 212° F., the ratio between the quantity of embedding material and granules being between 0.2 and 1, said steam introduced into said hardening reactor condensing on said embedding material, wherein the pH of the moist embedding material is above 4, and the heat generated said condensation being transferred to the granules by conduction, thus reducing the hardening time for curing the granules to a certain strength.

2. The process according to claim 1, wherein the granules to be hardened being deposited upon a layer of fine grained material, said layer being fed into the hardening reactor.

3. The process according to claim 1, wherein the granules are cured at a temperature between 160° and 212° F.

4. The process according to claim 1, wherein said ratio between the quantity of embedding material and said granules is from about 0.3 to 0.45.

5. The process of claim 1, wherein the embedding material is selected from the group consisting of fly ash at an elevated temperature and serving as an additional heat source for the hardening reaction and moist fly ash.

6. The process according to claim 1, whereby the embedding material has a water adsorption capacity of 15-25%.

7. The process of claim 1 wherin the binder is selected from the group of calcium hydroxide, milk of lime, and cement.

8. The process of claim 1 wherein the granules are produced from a mixture selected from the group consisting of lime, fly ash, water and sand, a mixture of lime, fly ash, water and other combustion products, and a mixture of lime, fly ash, calcium sulphate dihydrate and water.

9. The process of claim 1, wherein the embedding material is fly ash.

* * * * *